UNITED STATES PATENT OFFICE.

ROBERT GNEHM AND JAKOB SCHMID, OF BASLE, SWITZERLAND, ASSIGNORS TO THE SOCIETY OF CHEMICAL INDUSTRY IN BASLE, OF SAME PLACE.

BROWN DYE.

SPECIFICATION forming part of Letters Patent No. 491,422, dated February 7, 1893.

Application filed August 25, 1892. Serial No. 444,111. (Specimens.) Patented in France March 7, 1892, No. 219,925.

*To all whom it may concern:*

Be it known that we, ROBERT GNEHM and JAKOB SCHMID, citizens of Switzerland, residing at Basle, Switzerland, have invented new and useful Improvements in the Production of a Brown Coloring-Matter or Dye-Stuff, (for which we have received Letters Patent in France, No. 219,925, dated March 7, 1892,) of which the following is a specification.

Our invention is based upon the observation that the insoluble products in water which are obtained by combination of meta or para-diazo-benzoic acid with the so-called "Bismarck-brown" can be converted into readily soluble alkaline salts with the aid of potash or soda, thus forming useful brown coloring matters which dye unmordanted cotton.

The following is an example in which way our invention may be carried out in practice: 10.5 kilos of "Bismarckbrown J" (product obtained by the action of two molecules of nitrous acid upon three molecules of hydrochlorate of meta-phenylene-diamine) or "Bismarckbrown R" (analogous derivative from meta-toluylene-diamine) are dissolved in fifty liters of water. The solution is cooled with ice and introduced into a cold solution of meta-diazo-benzoic acid obtained by a mixture of 5.2 kilos of meta-amido-benzoic acid 2.6 kilos of sodium nitrite and eighteen kilos of muriatic acid. A brown substance is separated; its formation becomes complete as soon as a solution of twenty kilos of crystallized acetate of sodium is added. After stirring during several hours the product is filtered off, washed and pressed. In introducing this residue into a dilute warm solution of potash or soda, the dye-stuff dissolves and is precipitated from the solution with common salt in the form of brown flakes. It is filtered, pressed and dried and forms now a dark brown powder easily soluble in water. It dissolves with difficulty in alcohol with a brown-orange color and is insoluble in benzene. It is soluble in concentrated sulphuric acid from which solution it precipitates by addition of water.

The new coloring matter produces on unmordanted cotton in a neutral or alkaline bath dark yellow-brown shades.

What we claim as new and desire to secure by Letters Patent is:

The new brown dyestuff herein described being the sodium salt of an azo derivative of meta-diazo-benzoic acid and the so called Bismarck brown, which is a dark brown powder, insoluble in benzene but easily soluble in water, dissolving with difficulty in alcohol with a brown-orange color and soluble in concentrated sulphuric acid from which solution it precipitates by addition of water.

In testimony whereof we have hereunto set our hands in the presence of two subscribing witnesses.

ROBERT GNEHM.
JAKOB SCHMID.

Witnesses:
GEORGE GIFFORD,
F. WALTER.